(12) United States Patent
Bai et al.

(10) Patent No.: US 10,191,650 B2
(45) Date of Patent: *Jan. 29, 2019

(54) ACTIONABLE CONTENT DISPLAYED ON A TOUCH SCREEN

(71) Applicant: Microsoft Technology Licensing, LLC, Redmond, WA (US)

(72) Inventors: Peng Bai, Beijing (CN); Jun Du, Anhui (CN); Lei Sun, Beijing (CN); Qiang Huo, Beijing (CN)

(73) Assignee: MICROSOFT TECHNOLOGY LICENSING, LLC, Redmond, VA (US)

( * ) Notice: Subject to any disclaimer, the term of this patent is extended or adjusted under 35 U.S.C. 154(b) by 366 days.

This patent is subject to a terminal disclaimer.

(21) Appl. No.: 15/085,435

(22) Filed: Mar. 30, 2016

(65) Prior Publication Data

US 2016/0210040 A1   Jul. 21, 2016

Related U.S. Application Data

(63) Continuation of application No. 14/040,443, filed on Sep. 27, 2013, now Pat. No. 9,329,692.

(51) Int. Cl.
*G06F 3/0488* (2013.01)
*G06F 3/01* (2006.01)
*G06F 17/30* (2006.01)
*H04N 21/44* (2011.01)
*H04N 21/462* (2011.01)
(Continued)

(52) U.S. Cl.
CPC .......... *G06F 3/04883* (2013.01); *G06F 3/017* (2013.01); *G06F 3/04842* (2013.01); *G06F 17/30253* (2013.01); *G06F 17/30796* (2013.01); *H04N 21/44008* (2013.01); *H04N 21/4622* (2013.01); *H04N 21/84* (2013.01)

(58) Field of Classification Search
CPC ....................................................... G06F 3/017
USPC ......................................................... 345/173
See application file for complete search history.

(56) References Cited

U.S. PATENT DOCUMENTS 6,101,274 A   8/2000 Pizano et al.
6,178,270 B1  1/2001 Taylor
(Continued)

FOREIGN PATENT DOCUMENTS

CN   103294657 A   9/2013
EP     2466492 A1   6/2012
(Continued)

OTHER PUBLICATIONS

Yang, et al, "An Automatic Sign Recognition and Translation System", Interactive Systems Laboratory, Carnegie Mellon University, Pittsburgh, PA, 2001, pp. 1-pp. 8.
(Continued)

*Primary Examiner* — Jason C Olson
(74) *Attorney, Agent, or Firm* — Drinker Biddle & Reath LLP

(57) ABSTRACT

Some implementations may present a media file that includes video on a touchscreen display. A user gesture performed on the touchscreen display may be detected. The user gesture may include one of a tap gesture, a swipe gesture, or a tap and hold and drag while holding gesture. Text selected by the user gesture may be determined. One or more follow-up actions may be performed automatically based at least partly on the text selected by the user gesture.

20 Claims, 7 Drawing Sheets

(51) Int. Cl.
    H04N 21/84    (2011.01)
    G06F 3/0484   (2013.01)

(56) References Cited

U.S. PATENT DOCUMENTS

| | | |
|---|---|---|
| 6,298,173 B1 | 10/2001 | Lopresti |
| 6,731,788 B1 | 5/2004 | Agnihotri et al. |
| 7,043,080 B1 | 5/2006 | Dolan |
| 7,689,613 B2 | 3/2010 | Candelore |
| 8,774,514 B2 | 7/2014 | Kim et al. |
| 2001/0056342 A1 | 12/2001 | Piehn et al. |
| 2003/0120478 A1 | 6/2003 | Palmquist |
| 2003/0149557 A1 | 8/2003 | Cox et al. |
| 2003/0185448 A1 | 10/2003 | Seeger et al. |
| 2003/0200078 A1 | 10/2003 | Luo et al. |
| 2005/0114145 A1 | 5/2005 | Janakiraman et al. |
| 2007/0115264 A1 | 5/2007 | Yu et al. |
| 2007/0130563 A1 | 6/2007 | Elgazzar et al. |
| 2008/0002916 A1 | 1/2008 | Vincent et al. |
| 2008/0097984 A1 | 4/2008 | Candelore |
| 2008/0221862 A1 | 9/2008 | Guo et al. |
| 2008/0233980 A1 | 9/2008 | Englund et al. |
| 2008/0267504 A1 | 10/2008 | Schloter et al. |
| 2009/0048820 A1 | 2/2009 | Buccella |
| 2009/0052802 A1 | 2/2009 | Curtis |
| 2009/0228842 A1 | 9/2009 | Westerman et al. |
| 2010/0259771 A1 | 10/2010 | Sakamoto |
| 2010/0289757 A1 | 11/2010 | Budelli |
| 2010/0333044 A1 | 12/2010 | Kethireddy |
| 2011/0010668 A1 | 1/2011 | Feldstein et al. |
| 2011/0019821 A1 | 1/2011 | Kino |
| 2011/0081083 A1 | 4/2011 | Lee et al. |
| 2011/0116107 A1 | 5/2011 | Rueby |
| 2011/0123115 A1 | 5/2011 | Lee et al. |
| 2011/0137926 A1 | 6/2011 | Chen |
| 2011/0161889 A1 | 6/2011 | Scheer et al. |
| 2011/0209057 A1 | 8/2011 | Hinckley et al. |
| 2012/0131520 A1 | 5/2012 | Tang et al. |
| 2012/0134588 A1 | 5/2012 | Zhang et al. |
| 2012/0173963 A1 | 7/2012 | Hoke et al. |
| 2012/0182237 A1 | 7/2012 | Yun |
| 2012/0249595 A1 | 10/2012 | Feinstein |
| 2012/0306772 A1 | 12/2012 | Tan et al. |
| 2013/0058575 A1 | 3/2013 | Koo et al. |
| 2013/0103383 A1 | 4/2013 | Du et al. |
| 2013/0195315 A1 | 8/2013 | Baheti et al. |
| 2014/0111542 A1 | 4/2014 | Wan |
| 2015/0095855 A1 | 4/2015 | Bai et al. |
| 2016/0147743 A1 | 5/2016 | Du et al. |

FOREIGN PATENT DOCUMENTS

| | | |
|---|---|---|
| TW | 201246056 A | 11/2012 |
| WO | 2012099558 A1 | 7/2012 |
| WO | 2013138052 | 9/2013 |

OTHER PUBLICATIONS

"First Office Action and Search Report Issued in Chinese Patent Application No. 201480053251.4", dated Feb. 27, 2018, 10 Pages.
"EngkooService Service", retrieved on May 25, 2011 at <<http://dict.bing.com.cn/api/service.svc>> 1 page.
"Bing", retrieved on Oct. 19, 2011 at <<http://itunes.apple.com/app/bing/id345323231>>, iTunes Store, 3 pages.
"Bing Translator", retrieved on Oct. 19, 2011 at <<http://api.microsofttranslator.com/V2/Soap.svc>>, 3 pages.
Du, et al., "Snap and Translate Using Windows Phone," In International Conference on Document Analysis and Recognition, Sep. 18, 2011, 5 pages.
Fragoso et al., "TranslatAR: A Mobile Augmented Reality Translator on the Nokia N900," In White Papers of Software and Web Development, Jul. 2010, 7 pages.
"Google Goggles", 2011 at <<http://www.google.com/mobile/goggles/#text>>, Google, 5 pages.
Goto, Hideaki, "OCRGrid: A Platform for Distributed and Cooperative OCR Systems", 18th International Conference on Pattern Recognition, ICPR'06, 2006, 4 pages.
Huerta-Canepa, et al. "A Virtual Cloud Computing Provider for Mobile Devices", San Francisco, CA, USA, ACM Workshop on Mobile Cloud Computing & Services: Social Networks and Beyond. MCS '10, Jun. 15, 2010, 5 pages.
Lucas, S.M. et al., "ICDAR 2003 robust reading competitions: entries, results, and future directions", International Journal on Document Analysis and Recognition, vol. 7, Nos. 2-3, pp. 105-122, 2005.
Jagannathan, et al. "Crosslingual Access of Textual Information using Camera Phones", Proceedings of the International Conference on Cognition and Recognition, Jul. 2005, 6 pages.
Jung, et al., "Text Information Extraction in Images and Video: A Survey," In Journal of Pattern Recognition, vol. 37, Issue 5, May 2004, 21 pages.
Nakajima, et al., "Portable Translator Capable of Recognizing Characters on Signboard and Menu Captured by Built-in Camera", Proceedings of the ACL Interactive Poster and Demonstration Sessions, Ann Arbor, Jun. 2005, pp. 61-64.
Office action for U.S. Appl. No. 14/040,443, dated Oct. 22, 2015, Bai et al., "Actionable Content Displayed on a Touch Screen", 12 pages.
Office Action for U.S. Appl. No. 13/277,109, dated Nov. 25, 2014, Du et al. "Translating Language Characters in Media Content", 11 pages.
Office action for U.S. Appl. No. 13/277,109, dated Mar. 16, 2015, Du et al., "Translating Language Characters in Media Content", 13 pages.
Office action for U.S. Appl. No. 13/277,109, dated Sep. 16, 2015, Du et al., "Translating Language Characters in Media Content", 12 pages.
Melkman et al., "On-line Construction of the Convex Hull of a Simple Polyline", Information Processing Letters, vol. 25, No. 1, pp. 11-12, 1987.
Wu et al., "Optimizing Two-Pass Connected-Component Labeling Algorithms," Pattern Analysis & Applications, vol. 12, pp. 117-135, 2009.
International Search Report and Written Opinion Issued in PCT Application No. PCT/US2014/057077, dated Jan. 19, 2015, 10 Pages.
The International Preliminary Report on Patentability dated Dec. 10, 2015 for PCT Application No. PCT/US14/57077, 16 pages.
Pietikainen et al., "Edge-Based Method for Text Detection from Complex Document Images", Document Analysis and Recognition, Proceedings, Sixth International Conference on, IEEE, 2001, 6 pages.
"Pleco Software—Chinese Dictionaries for iPhone and Windows Mobile", retrieved on May 25, 2011 at <<http://www.pleco.com/>>, Pleco Software Incorporated, Copyright 2001-2010, 6 pages.
Nakajima et al. "Portable Translator Capable of Recognizing Characters on Signboard and Menu Captured by Built-in Camera," Proceedings of the ACL Interactive Poster and Demonstration Sessions, Association for Computational Linguistics, Ann Arbor, Jun. 2005, pp. 61-64.
Petzold, Charles; "Programming Windows Phone 7," Microsoft Press, Redmond, WA, 2010, 1013 pages.
Haritaoglu, Ismail; "Scene Text Extraction and Translation for Handheld Devices," Proc. CVPR, 2001, pp. II-408-II-413.
Vogel et al., "Shift: A Technique for Operating Pen-Based Interfaces Using Touch," CHI 2007 Proceedings, Apr. 28-May 3, 2007, San Jose, CA, USA, pp. 657-666.
Sun et al., "A Component-Tree based Method for User-Intention Guided Text Extraction," in 21st International Conference on Pattern Recognition, Nov. 11, 2012, 4 pages.
Yang et al., "Towards Automatic Sign Translation," Proc. HLT, 2001, 6 pages.
Fragoso et al., "TranslatAR: A Mobile Augmented Reality Translator," Proc. IEEE Workshop on Applications of Computer Vision (WACV) 2011, pp. 497-502.
Watanabe et al., "Translation Camera on Mobile Phone," Proc. ICME-2003, pp. II-177-II-180.

(56) References Cited

OTHER PUBLICATIONS

"Word Lens," retrieved on May 25, 2011, at <<http://questvisual.com/>> Quest Visual, Copyright 2010, 3 pages.
Yang, et al., "On Effective Offloading Services for Resource-Constrained Mobile Devices Running Heavier Mobile Internet Applications", IEEE Communications Magazine, Jan. 2008, 8 pages.
"Office Action and Search Report Issued in Taiwan Patent Application No. 103128323", dated Oct. 27, 2017, 10 Pages.

ACTIONABLE CONTENT DISPLAYED ON A TOUCH SCREEN

CROSS-REFERENCE TO RELATED APPLICATION(S)

This application is a continuation of U.S. application Ser. No. 14/040,443, filed on Sep. 27, 2013, and entitled "Actionable Content Displayed on a Touch Screen", which is incorporated by reference herein in its entirety.

BACKGROUND

When a user is viewing a media file, such as a video file, streaming video, a document, a web page, or the like, the user may desire to obtain information regarding text displayed by the media file. For example, a user viewing a presentation on a technical topic may desire to obtain information associated with one of the authors of the presentation or with the technical topic. The user may pause viewing of the media file, open a web browser, navigate to a search engine, perform a search using the name of an author or keywords from the technical topic, view the results, and select one or more links displayed in the results to obtain more information. After the user has obtained the information, the user may resume viewing the media file. The user may repeatedly pause viewing of the media file each time the user desires to obtain information regarding text displayed by the media file. However, repeatedly pausing viewing of a media file each time a user desires to obtain information regarding text displayed by the media file may be time consuming and/or may disrupt the flow of the material presented via the media file.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations may present a media file that includes video on a touchscreen display. A user gesture performed on the touchscreen display may be detected. The user gesture may include one of a tap gesture, a swipe gesture, or a tap and hold and drag while holding gesture. Text selected by the user gesture may be determined. One or more follow-up actions may be performed automatically based at least partly on the text selected by the user gesture.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
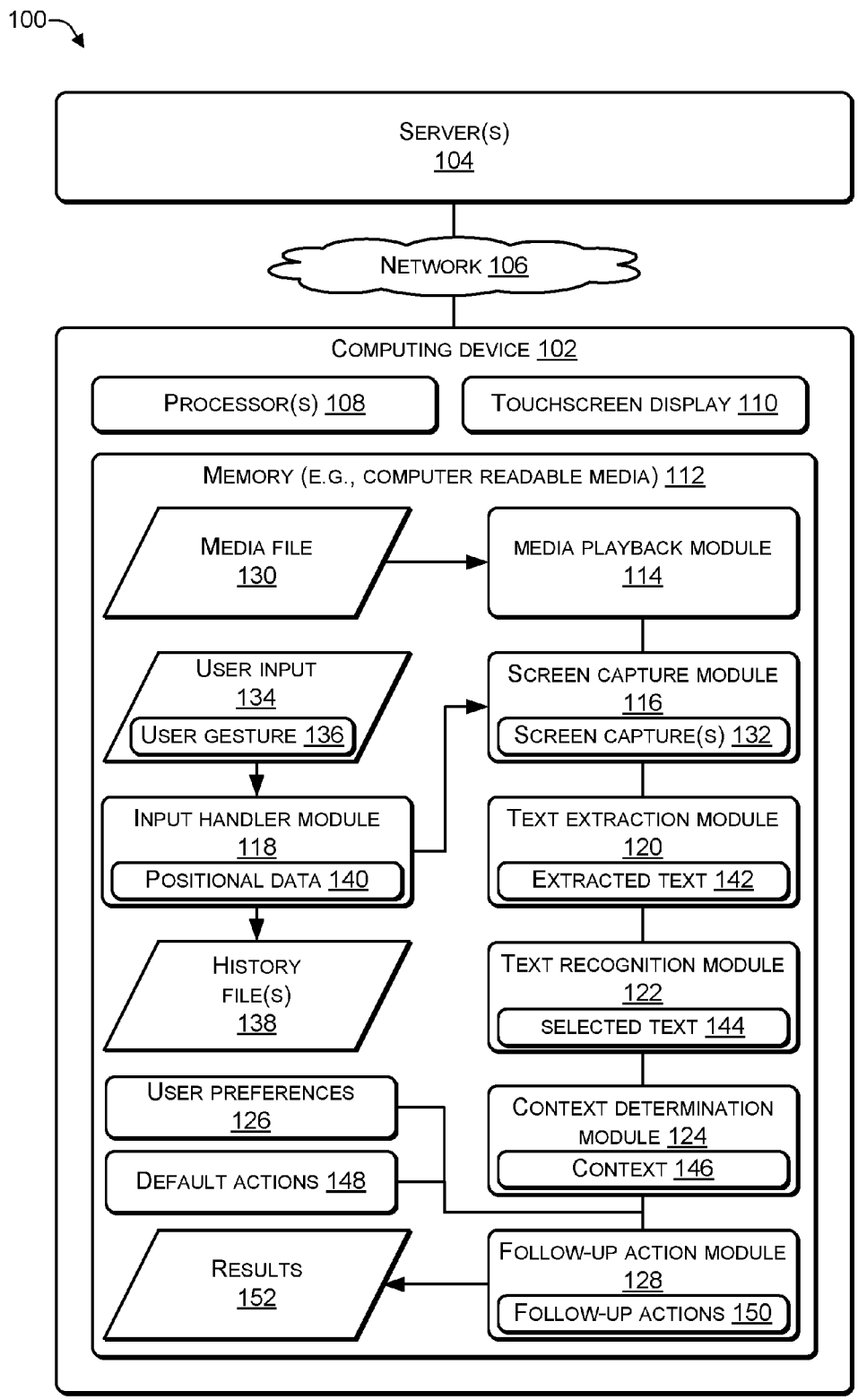
FIG. 1 is an illustrative architecture that includes a follow-up action module according to some implementations.

As discussed above, repeatedly pausing viewing of a media file each time a user desires to obtain information regarding text displayed by the media file may be time consuming and/or may disrupt the flow of the material presented via the media file. The systems and techniques described herein may enable different actions to be performed automatically in response to detecting a user gesture on a touchscreen that is displaying media that includes text. The user gesture may select text displayed by the media using gestures such as tapping a portion of the touchscreen where a word is displayed, swiping a portion of the touchscreen where two or more words are displayed, or tapping and holding a first portion of the touchscreen and then dragging (while holding) over a second portion of the touchscreen. The latter gesture may also be referred to as a tap and hold and drag while holding. The gestures described herein may be performed using various techniques, including using at least a portion of an appendage (e.g., a fingertip) of the user, using a selection tool (e.g., a stylus), using multi-touch (e.g., a fingertip and a thumb or two fingertips) gestures, non-touch gestures (e.g., gestures recognized by a camera, such as Microsoft's Kinect®), touch plus voice command (e.g., touch a word and then say "search" or "translate"), another type of input mechanism, or any combination thereof.

A user may view a media file on a computing device having a touchscreen display. For example, the computing device may include a desktop computer, a laptop computer, a tablet computer, a mobile phone, a gaming device, a media playback device, or other type of computing device. The media file may be a video (e.g., a video file or streaming video), an audio file that causes text (e.g., information associated with the audio file, such as a title, artist information, lyrics, or the like) to be displayed, a document, an image file (e.g., a picture, a photograph, or a computer generated image), a page displayed by a web browser, another type of media file, or any combination thereof. The user may perform a user gesture on the touchscreen at a position that approximately corresponds to a location on the touchscreen where the text is displayed by the media file.

A tap gesture refers to applying pressure to a portion of the touchscreen for a predetermined period of time (e.g., between 200 and 800 milliseconds). A swipe gesture refers to applying pressure from a starting position to an ending position of the touchscreen. A tap and hold and drag while holding gesture refers to applying pressure at a starting position for a predetermined period of time and, while continuing to apply pressure, moving the location of the pressure to an ending position of the touchscreen. For media files that display multiple frames or pages, the tap and hold and drag while holding gesture may cover multiple frames or pages. For example, the tap and hold at a starting position may cause video playback to be paused. While continuing to apply pressure (e.g., while holding), dragging (e.g., moving) the location of the pressure to the ending position may cause the paused media to advance (e.g., a video may advance to one or more next frames or a document may advance to one or more next pages). In this way, the tap and hold and drag while holding gesture may select text from a media file that may be displayed using multiple video frames, multiple document pages, or the like. When a video that includes text is being displayed, the tap and hold and drag while holding gesture may span more than one frame of video to select text from more than one video frame. When a document with multiple pages of text is being displayed, the tap and hold and drag while holding gesture may span more than one page of the document to select text from more than one page of the document.

In response to detecting a user gesture (e.g., tap, swipe, or tap and hold and drag while holding), one or more screens may be captured to capture a portion of the media file being displayed on the touchscreen when the gesture was performed. For example, when a document is displayed, the text displayed when the user gesture was performed may be captured. As another example, when a video is displayed, one or more frames of the video may be captured using a frame grabber.

Positional information associated with the user gesture may be determined. For example, for a tap gesture, coordinates (e.g., x and y coordinates) on the touchscreen associated with the tap gesture may be determined. For a swipe gesture, start coordinates and end coordinates associated with the swipe gesture may be determined. For a tap and hold and drag while holding gesture, start coordinates and end coordinates for each frame, page, or other type of display unit may be determined. If the user gesture is performed when a video file, an audio file, or other type of file that includes temporal information is being displayed, temporal information, such as a time stamp or time code, associated with the user gesture may be determined in addition to the positional information. For example, when a tap gesture or a swipe gesture is performed when a video file is being displayed on the touchscreen display, positional information and temporal information associated with the user gesture may be determined. To illustrate, the temporal information may include a start time associated with the user gesture (e.g., a first time code identifying when the user gesture was initiated), an end time associated with the user gesture (e.g., a second time code identifying when the user gesture ended), another type of temporal information associated with the user gesture, or any combination thereof.

Text image patches may be extracted from the screen capture(s) based on the positional information associated with the user gesture by using an efficient user-intention guided text extraction algorithm. The extracted text images may use optical character recognition (OCR) or a similar text extraction technique to determine the selected text. For example, in response to a tap gesture, a word may be extracted from the screen capture. The extracted word may correspond to text from the media file that was displayed at or near a position on the touchscreen where the tap gesture was performed. In response to a swipe gesture, one or more words may be extracted from the screen capture. The extracted words may correspond to portions of text from the media file that were displayed at or near positions on the touchscreen where the swipe gesture was performed. In response to a tap and hold and drag while holding gesture, one or more words may be extracted from one or more screen captures. The extracted words may correspond to portions of text from the media file that were displayed at or near positions in on the touchscreen where the tap and hold and drag while holding gesture was performed.

After one or more words have been extracted from the screen capture(s), one or more actions may be performed automatically (e.g., without human interaction). The actions that may be performed automatically may include translating the selected text from a first language to a second language, performing an internet search, performing a search of a particular web address, or the like. The actions that are performed automatically in response to a user gesture on the touchscreen may be determined based on a context associated with the selected text (e.g., text located before and/or after the selected text, a website or server from which the media was obtained, an author or creator of the media, etc.), user preferences, a default set of actions, or any combination thereof. For example, a default set of actions may include performing a search using the selected text. As another example, user preferences may specify a set of actions that include translating the selected text to a target language, displaying the translated text, and performing a search using the translated text.

The results of the actions that are automatically performed may be displayed in a window in which the media file is being displayed or in a second window. The second window may be displayed adjacent to the window displaying the media or in as a pop-up window (e.g., overlaid on the window displaying the media). For example, a translation of the selected text and results of an internet search using the translated text may be displayed in a pop-up window that overlays the window displaying the media. As another example, a translation of the selected text may be displayed in a first pop-up window and results of an internet search using the translated text may be displayed in second pop-up window.

In some cases, two interaction models may be used. A first interaction model may be used when user gestures are received when a user is viewing media content (e.g., video files, audio files, documents, or the like). When the user performs user gestures while viewing media content, one or more default actions may be performed and the results of the default actions may be displayed in a second (e.g., pop-up) window. A second interaction model may be used for the user gestures received while viewing the results of the default actions in the second window. For example, the first interaction model may include translating the selected text from a source language to a target language and performing a search using the translated text. The second interaction model may include performing a search using the selected text. In this example, translation of the selected text is performed in the first interaction model but not in the second interaction model. The first interaction model and the second interaction model may be specified using a user profile, a user preferences file, or similar user-specific customization technique.

Thus, when viewing a media file, a user may input a gesture to cause (1) text to be extracted from a portion of the media file and (2) one or more actions to be automatically performed using the extracted text. The user gestures may include, for example, a tap gesture, a swipe gesture, and a tap and hold and drag while holding. The actions that may be automatically performed in the response to the user gesture may include, for example, translating the selected text, performing a search using the selected text, or the like. For example, a user viewing a technical presentation (e.g., a video, a set of slides, a document, web pages, etc.) may tap or swipe a technical word or phrase to obtain additional information associated with the technical word or phrase. As another example, a user viewing the technical presentation may tap or swipe an author's name to obtain additional information associated with the author.

Illustrative Architectures

FIG. 1 is an illustrative architecture 100 that includes a follow-up action module according to some implementations. The architecture 100 includes a computing device 102 coupled to one or more servers 104 using a network 106.

The servers 104 may provide various network-based services, such as search services to search the internet, translation services to translate a word, a phrase, or a sentence from a source language to a target language, etc. The network 106 may include wired and/or wireless networks. The wired networks may use a variety of protocols and standards, such as one or more of Ethernet, data over cable service interface specification (DOCSIS), digital subscriber line (DSL), and the like. The wireless networks may use a variety of protocols and standards, such as one or more of code division multiple access (CDMA), global system for mobile (GSM), WiFi, (e.g., 802.11), and the like.

The computing device 102 may be a desktop computer, a laptop computer, a tablet computer, a media playback device, a mobile phone device, another type of computing device, or any combination thereof. The computing device 102 may include one or more processors 108, a touch screen display 110, and a memory 112. The memory 112 may be used to store instructions that are executable by the processors 108 to perform various functions. The instructions may be grouped by the functions that the instructions perform into modules. For example, the memory may include a media playback module 114, a screen capture module 116, an input handler module 118, a text extraction module 120, a text recognition module 122, a context determination module 124, user preferences 126, and a follow-up action module 128.

The media playback module 114 may be capable of presenting (e.g., playing or displaying) different types of media, including video files, audio files, documents (e.g., in formats that are compliant with Microsoft® Word®, portable document format (PDF), rich text format (RTF), pages displayed by a web browser, or other document formats), and other types of media files. During playback of a media file 130, the media playback module 114 may display text included in or associated with the media file 130. For example, when playing a video file, the media playback module 114 may display text when the video file includes text, such as a title of the video file or an author of the video file. As another example, when playing an audio file, the media playback module 114 may display text, such as a name of the audio file, a name of an album that includes the audio file, a name of a musician associated with the audio file, lyrics associated with the audio file, other text associated with the audio file, or any combination thereof. At least a portion of text that is displayed may be included in the audio file or may be retrieved from one of the servers 104 by the media playback module 114. The media file 130 may be a file stored in the memory 112 or a file that is streamed from one of the servers 104 across the network 106.

The screen capture module 116 may capture screen shots of media content being displayed on the touchscreen display 110 by the media playback module 114 when presenting the media file 130. The media content being displayed may include text. For example, the screen capture module 116 may create one or more screen captures 132. The way in which the screen capture module 116 captures the displayed media content may vary depending on a type of the media file 130. For example, when the media file 130 is a video file, the screen capture module 116 may use a frame grabbing technique to capture one or more frames of the video. As another example, when the media file 130 is a document, the screen capture module 116 may use a screen capture technique to capture one or more screens of content from the document that is displayed.

The input handler module 118 may receive user input 134, including gestures made by a user on the touchscreen display 110. The input handler module 118 may detect and identify gestures included in the user input 134. For example, the input handler module 118 may detect and identify a user gesture 136 that is input using the touchscreen display 110. In response to detecting the user gesture 136, the input handler module 118 may instruct the screen capture module 116 to capture the screen captures 132 from the portions of the media file 130 that the media playback module 114 is presenting on the touchscreen display 110.

The input handler module 118 may create history files 138 that include information about which user gestures were received and times at which they were received. For example, the input handler module 118 may create a history file for each user's interaction with each media file. The history files 138 are described in more detail below.

The input handler module 118 may determine positional data 140 associated with each user gesture 136. For example, when the user gesture 136 is a tap gesture, the positional data 140 may identify a location (e.g., x and y coordinates) on the touchscreen display 110 where the user gesture 136 was detected. When the user gesture 136 is a swipe gesture, the positional data 140 may identify a start location and an end location on the touchscreen display 110 where the user gesture 136 was detected. When the user gesture 136 is a tap and hold and drag while holding gesture, the positional data 140 may identify a start location and an end location on the touchscreen display 110 of each frame (or page) of the media file 130 associated with the user gesture 136.

The text extraction module 120 may extract text from the screen captures 132 as extracted text image 142. For example, the text extraction module 120 may use a user-intention guided text extraction algorithm to create extracted text image 142 from the screen captures 132. The text extraction module 120 may use the screen captures 132 and the user gesture 136 as input and output positions and bounding boxes of text areas, which may include user selected text, intended text (e.g., determining a user intention based on the user gesture and selecting text based on the user intention), and contextual text. For a tap and hold and drag while holding gesture, the text extraction module 120 may extract multiple lines of text from the image, including text that spans multiple frames of a video or multiple pages of a document.

A component-tree, with each node representing an external region (e.g., a popular type of image representation method), may be used to design an efficient user-intention guided text extraction algorithm to automatically extract text. Instead of or in addition to considering each node of the component-tree independently, additional information, such as structural information of the tree, text line information, and user intent may be used to prune non-text nodes of the component-tree. For example, when a user gesture is detected, the image may be resized. Two component trees may be built from the resized image by assuming black text on a white background and white text on a black background. The two component trees may be pruned separately. A bounding box of the text may be calculated by grouping the surviving nodes in each tree (e.g., the nodes that survive pruning). The results from the two component trees may be compared and the better one chosen as the output. Pruning may include pruning using contrast and geometric information and pruning using user-intention and text line information. The pruning step may be used to prune as many obvious non-text regions as possible.

The text recognition module 122 may take the extracted text image 142 as input, and generate the selected text 144 using OCR. The text recognition module 122 may correlate the positional data 140 with the screen captures 132 to identify the text selected by the user, e.g., selected text 144. For example, the positional data 140 may be correlated with the screen captures 132 to identify portions of the extracted text 142 that correspond to portions of the displayed media file that were selected by the user gesture 136. To illustrate, the screen captures 132 may include text from a frame of a video or a page of a document. The extracted text 142 may include words that correspond to the text from the frame of the video or the page of the document. The text recognition module 122 may use the positional data 140 to identify the selected text 144 (e.g., text displayed on the touch screen display 110 that is selected by the user gesture 136) from the extracted text 142.

The selected text 144 may also be referred to as actionable text because the selected text 144 may be used by the follow-up action module 128 to perform one or more follow-up actions. The follow-up action module 128 may perform follow-up actions based on various information. For example, each user may specify user preferences 126 (e.g., in a user profile) identifying a specific set of actions to perform in response to a particular user gesture. To illustrate, the user preferences 126 may specify that for a particular user, a first set of actions is to be performed in response to a tap gesture, a second set of actions is to be performed in response to a swipe gesture, and a third set of actions is to be performed for a tap and hold and drag while holding gesture.

The context determination module 124 may determine a context 146 of the selected text 144 by examining words in the extracted text 142 that are near the selected text 144. For example, the follow-up module 128 may determine that the selected text 144 is a common word, instruct the context determination module 124 to determine a user intent, determine the context 146 based on the user intent, and perform follow-up actions based on the selected text 144 and the context 146. To illustrate, when viewing a presentation on the topic "neural networks," the user may perform a tap gesture to select the word "networks." The follow-up module 128 may determine that the selected text 144 (e.g., "networks") is a common word, instruct the context determination module 124 to determine the context 146 (e.g., "neural"), and perform follow-up actions based on the selected text 144 and the context 146 (e.g., "neural" and "networks"). As another example, the author of the presentation may be displayed as "Geoffrey Hinton." The user may perform a tap gesture to select the word "Geoffrey." The follow-up module 128 may determine that the selected text 144 (e.g., "Geoffrey") is a common first name, instruct the context determination module 124 to determine the context 146 (e.g., "Hinton"), and perform follow-up actions based on the selected text 144 and the context 146 (e.g., "Geoffrey" and "Hinton"). In some cases, the follow-up module 128 may modify the selected text 144 based on the context 146 and perform follow-up actions based on the modified selected text 144.

If a user does not have an associated set of the user preferences 126, and the follow-up module 128 determines that the context 146 associated with the selected text 144 does not need to be determined, the follow-up module 128 may perform one or more default actions 148. Thus, the follow-up action module 128 may determine follow-up actions 150 that are to be performed based on one or more of the selected text 144, the context 146, the user preferences 126, or the default actions 148.

After determining the follow-up actions 150, the follow-up action module 128 may perform one or more of the follow-up actions 150 and display results 152 from performing the follow-up actions 150. The follow-up actions 150 may include actions performed by the computing device 102, actions performed by the servers 104, or both. For example, the follow-up actions may include translating the selected text 144 using a dictionary stored in the memory 112 of the computing device 102 and then sending the translated text to a search engine hosted by one of the servers 104. The results 152 may include the translated text and search results from the search engine. As another example, the follow-up actions may include translating the selected text 144 using a translation service hosted by one of the servers 104, receiving the translated text from the translation service, and then sending the translated text to a search engine hosted by one of the servers 104. The results 152 may include the translated text and search results. As yet another example, the results 152 may include using a text to speech generator to pronounce one or more of the selected text. The text to speech generator may be a module of the computing device 102 or a service hosted by one of the servers 104.

The results 152 may be displayed in various ways. For example, the results 152 may be displayed in a pop-up window that overlays at least a portion of the window in which the media file 130 is being presented. The results 152 may be displayed in a same window in which the media file 130 is being presented. The media file 130 may be presented in a first window and the results 152 may be displayed in a second window that is adjacent to (e.g., above, below, to the right, or to the left) the second window. How the results 152 are displayed to the user may be specified by the user preferences 126 or by a set of default display instructions.

The user may interact with contents of the results 152 in a manner similar to interacting with the media file 130. For example, the results 152 may include search results that include video files that may be viewed (e.g., streamed) by selecting a universal resource locator (URL). In response to selecting the URL of a video file, the media playback module 114 may initiate presentation of the video files associated with the URL. The user may input additional user gestures to select additional text, cause additional follow-up actions to be performed, and display additional results, and so on. As another example, the user may input a user gesture to select a word or phrase in the results 152, cause additional follow-up actions to be performed, and display additional results, and so on.

The input handler module 118 may record the user gesture 136 and information associated with the user gesture 136 in the history files 138. For example, when the media file 130 is a video file or an audio file, the input handler module 118 may record the user gesture 136, the positional data 140, and a time stamp identifying a temporal location in the media file 130 where the user gesture 136 was received. The input handler module 118 may record a first set of user gestures performed on the results 152, a second set of user gestures performed on the results of the performing the first set of user gestures, and so on. The history files 138 may assist the user in locating a temporal location during playback of the media file when the user gesture 136 was input. The media playback module 114 may display a video timeline that identifies each user gesture that was input by the user to enable the user to quickly position the presentation of the media file 130. A history file may be stored separately for each user and/or for each session. The user may search through an index of the contents of each history file based on the selected text of each media file. Each of the history files 138 may include highlighted information and/or annotations. For example, when a user is viewing an online course (e.g., a video and/or documents), the user may highlight keywords in the media file 130 and/or add annotations to the keywords. The user may use user gestures to select keywords for highlighting and/or annotating. Because the highlight information and/or annotations are stored together in the history file, the user may search for highlighted text and/or annotations and find the corresponding video, along with information of previously performed actions (e.g., automatically performed follow-up actions and/or actions performed by the user).

Thus, a user gesture selecting a portion of text displayed by a media file may cause one or more follow-up actions to be performed automatically (e.g., without human interaction). For example, a user may view the media file 130 using the media playback module 114. The user may perform the user gesture 136 on the touchscreen display 110. In response to detecting the user gesture 136, the positional data 140 of the user gesture 136 may be determined and one or more screen captures 132 may be created. Extracted text 142 may be extracted from the screen captures 132. The screen captures 132 and the positional data 140 may be used to identify the selected text 144. In some cases, the context 146 of the selected text 144 may be determined and/or the user preferences 126 associated with the user may be determined. The follow-up actions 150 may be performed based on one or more of the selected text 144, the context 146, the user preferences 126, or the default actions 148. The results 152 of the follow-up actions 150 may be automatically displayed on the touchscreen display 110. In this way, while viewing a media file, a user can perform a user gesture on a touchscreen and cause various actions to be performed automatically and have the results displayed automatically. For example, a user viewing a technical presentation, such as a video or a document, may use a user gesture to select different words or phrases displayed by the technical presentation. In response to the user gesture, various actions may be performed and the results automatically displayed to the user. For example, the user may automatically obtain translations and/or search results in response to the user gesture.

Figure 2:
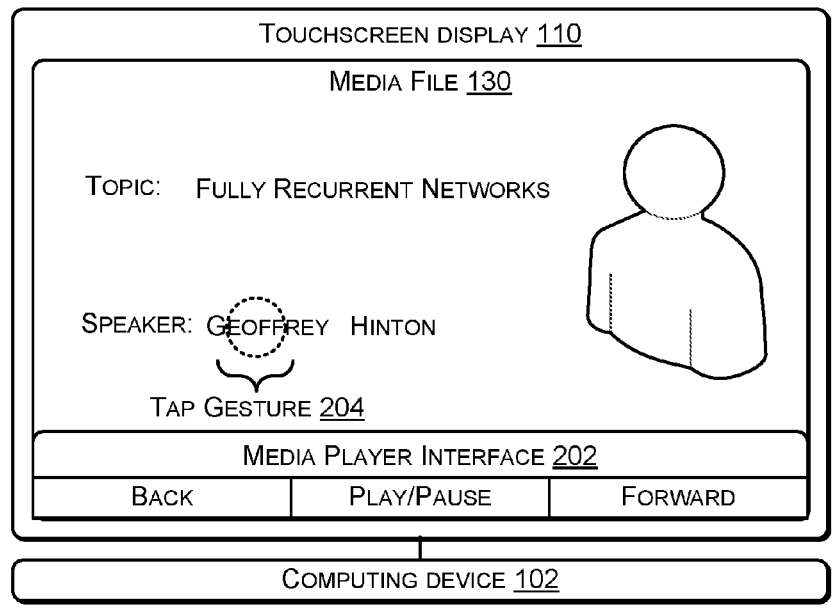
FIG. 2 is an illustrative computing device having a touchscreen display user interface that illustrates receiving a tap gesture according to some implementations.
Figure 2:
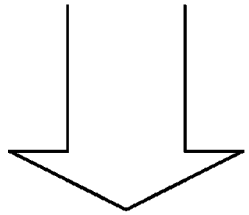
Figure 2:
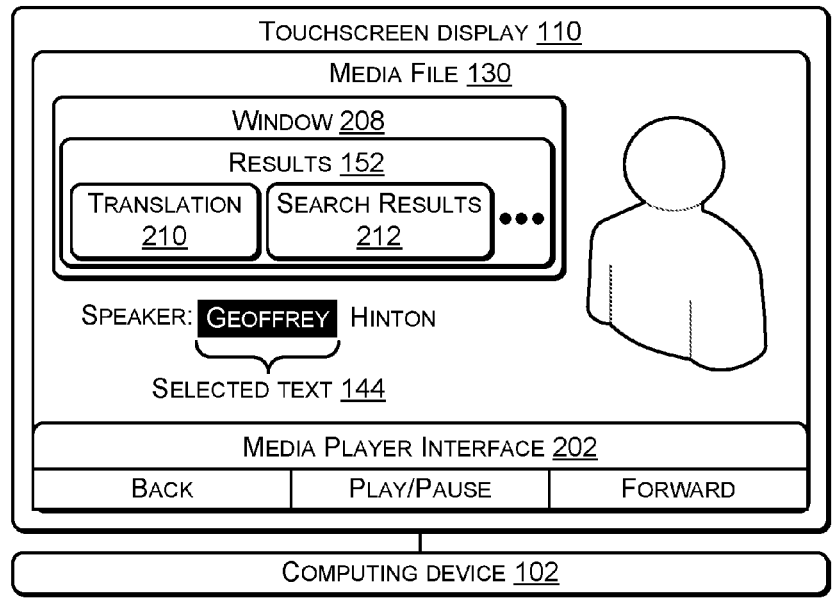

FIG. 2 is an illustrative computing device 200 having a touchscreen display user interface that illustrates receiving a tap gesture according to some implementations. A media player interface 202 may be provided to enable a user to view a media file, such as the media file 130.

In response to the user performing a tap gesture 204 on the touchscreen display 110, the computing device 102 may determine the selected text 144. For example, in FIG. 2, the user may perform the tap gesture 204 at or near at least a portion of the word "Geoffrey." In response to detecting the tap gesture 204, the computing device 102 may identify the selected text 144. For example, the computing device 102 may determine positional data associated with the tap gesture 204 and perform a screen capture. The computing device 102 may extract text from the screen capture (e.g., using OCR) and determine the selected text 144 based on the positional data and the extracted text.

The computing device 102 may perform one or more actions based on the selected text 144 and provide the results 152 in a window 208. For example, the results 152 may include a translation 210 corresponding to the selected text 144, search results 212 based on the selected text 144 and/or the translation 210, and/or results from any other follow-up actions.

In some cases, two interaction models may be used. A first interaction model may be used when user gestures are received when a user is viewing the media file 130. When the user performs user gestures while viewing the media file 130, one or more default actions may be performed and the results of the default actions may be displayed in the window 208. A second interaction model may be used for the user gestures received while viewing the results of the default actions in the window 208. For example, the first interaction model may include translating the selected text from a source language to a target language and performing a search using the translated text. The second interaction model may include performing a search using the selected text. In this example, translation of the selected text is performed in the first interaction model but not in the second interaction model. The first interaction model and the second interaction model may be specified using a user profile, a user preferences file, or similar user-specific customization technique.

Thus, in response to the tap gesture 204, the computing device may automatically select a word (e.g., "Geoffrey") as the selected text 144. The computing device 102 may automatically perform one or more follow-up actions using the selected text 144. The computing device 102 may automatically display the results 152 of the follow-up actions in a window 208.

Figure 3:
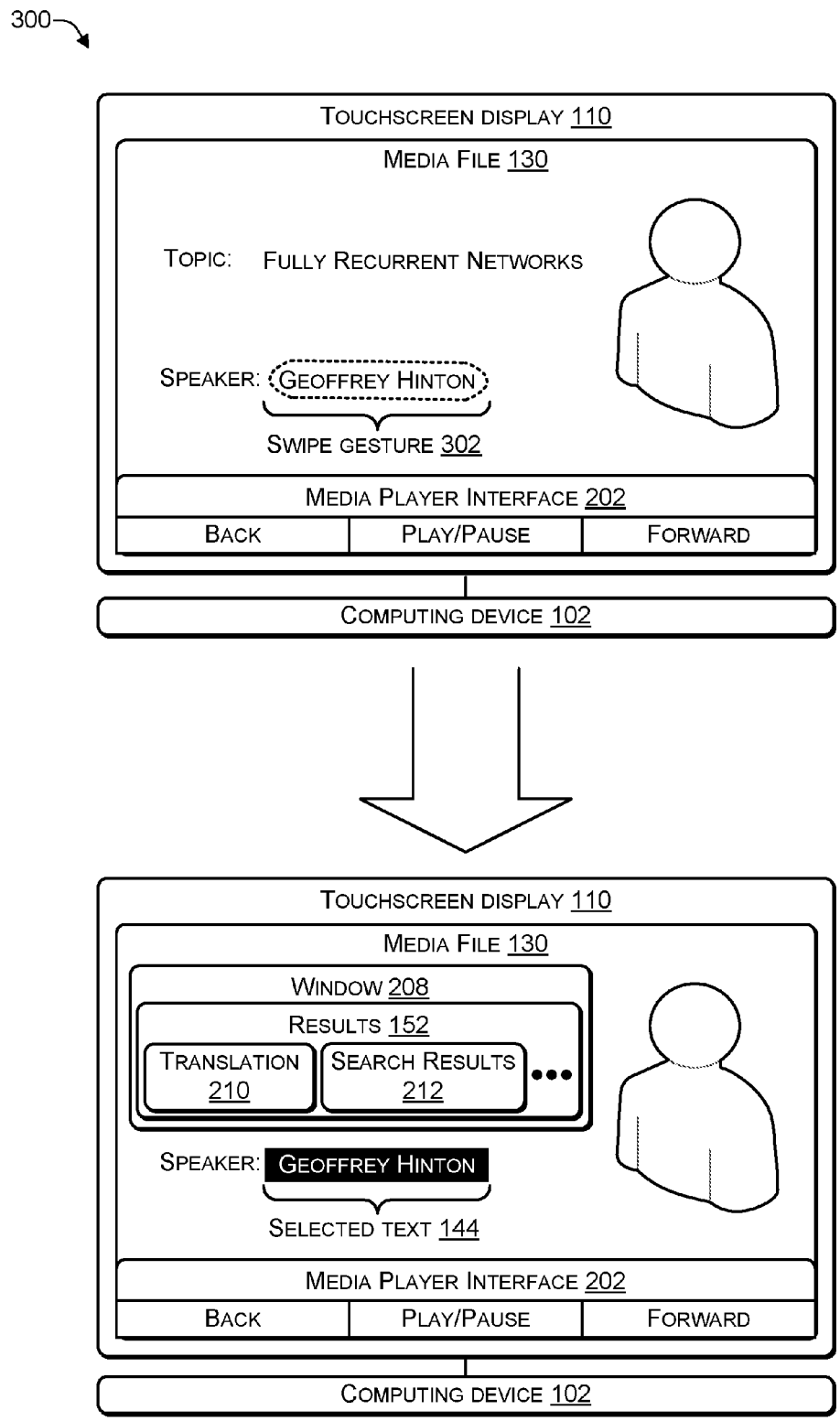
FIG. 3 is an illustrative computing device having a touchscreen display user interface that illustrates receiving a swipe gesture according to some implementations.

FIG. 3 is an illustrative computing device 300 having a touchscreen display user interface that illustrates receiving a swipe gesture according to some implementations. In response to the user performing a swipe gesture 302 on the touchscreen display 110, the computing device 102 may determine the selected text 144. For example, in FIG. 3, the user may perform the swipe gesture 302 at or near at least a portion of the phrase "Geoffrey Hinton."

In response to detecting the swipe gesture 302, the computing device 102 may identify the selected text 144. For example, the computing device 102 may determine positional data (e.g., a start position and an end position) associated with the swipe gesture 302 and perform a screen capture. For example, if the media file 130 includes video data, a video grabber module may capture one or more frames of the video data. The computing device 102 may extract text from the screen capture (e.g., using OCR) and determine the selected text 144 based on the positional data and the extracted text.

The computing device 102 may perform one or more actions based on the selected text 144 and provide the results 152 in the window 208. For example, the results 152 may include a translation corresponding to the selected text 144, search results based on the selected text 144 and/or the translation, and/or results from any other follow-up actions.

As previously mentioned, two interaction models may be used. A first interaction model may be used when user gestures are received when a user is viewing the media file 130. When the user performs user gestures while viewing the media file 130, one or more default actions may be performed and the results of the default actions may be displayed in the window 208. A second interaction model may be used for the user gestures received while viewing the results of the default actions in the window 208.

Thus, in response to the swipe gesture 302, the computing device may automatically select a phrase (e.g., "Geoffrey Hinton") as the selected text 144. The computing device 102 may automatically perform one or more follow-up actions using the selected text 144. The computing device 102 may automatically display the results 152 of the follow-up actions in the window 208.

Figure 4:
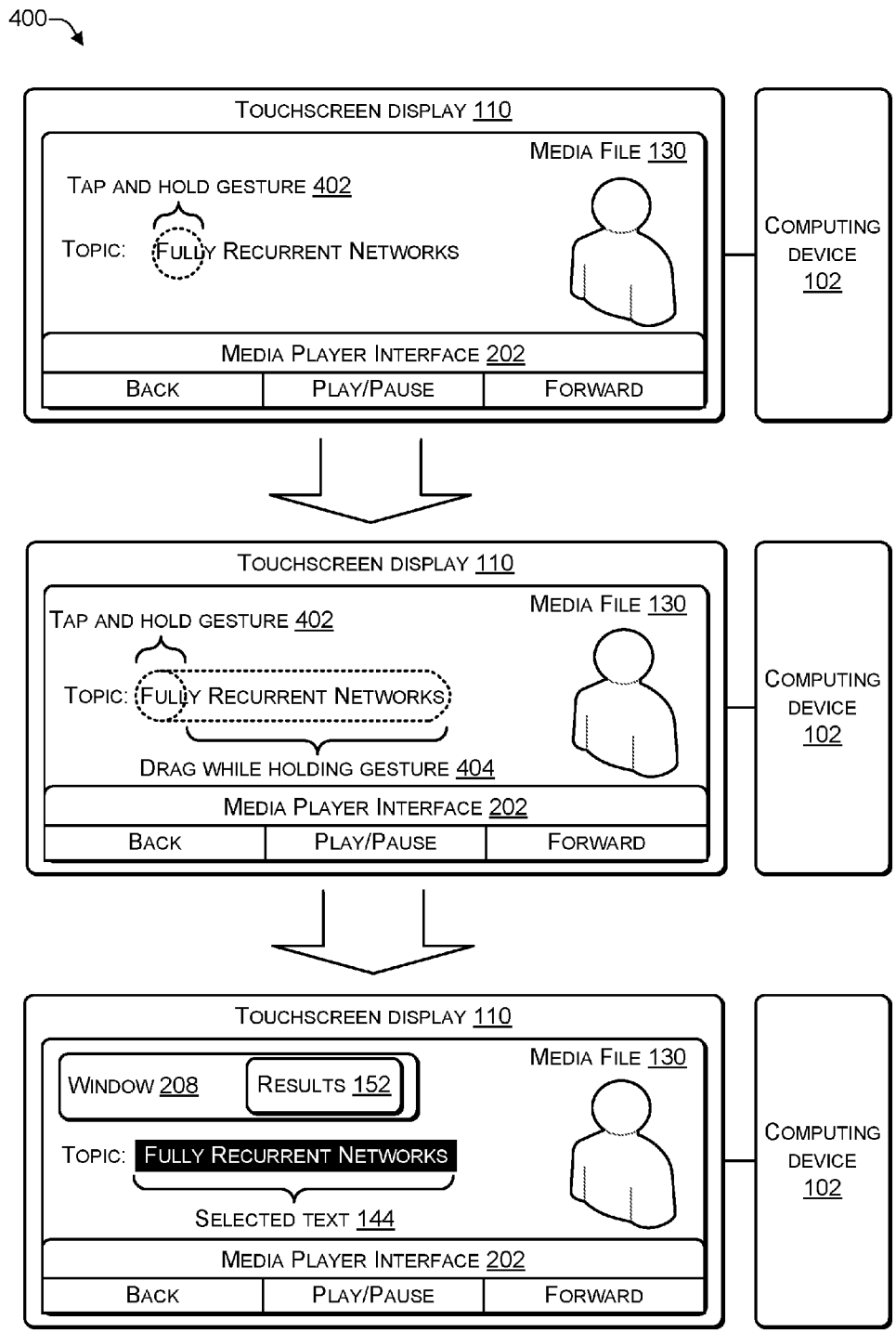
FIG. 4 is an illustrative computing device having a touchscreen display user interface that illustrates receiving a tap and hold gesture according to some implementations.

FIG. 4 is an illustrative computing device 400 having a touchscreen display user interface that illustrates receiving a tap and hold gesture according to some implementations. In response to the user performing a tap and hold gesture 402 on the touchscreen display 110, the computing device 102 may determine the selected text 144. For example, in FIG. 4, the user may perform the tap and hold gesture 402 at or near at least a portion of the word "Fully." In response to detecting the tap and hold gesture 402, the computing device 102 may, in some cases, pause playback (or display) of the media file 130 to enable the user to select text displayed in multiple frames (or multiple pages).

The computing device 102 may wait a predetermined period of time to receive a drag while holding gesture 404. If the user does not input the drag while holding gesture 404 within the predetermined period of time, the computing device 102 may treat the tap and hold gesture 402 as the tap gesture 204. If the user inputs the drag while holding gesture 404 within the predetermined period of time, the computing device 102 may advance presentation (e.g., display additional pages or playback additional frames) of the media file 130 until the drag while holding gesture 404 stops, e.g., until the user releases the hold.

The computing device 102 may determine positional data (e.g., one or more start positions and end positions) associated with the tap and hold gesture 402 and the drag while holding gesture 404. The computing device 102 may capture one or more screen captures of the media file 130. For example, if the computing device 102 advanced presentation of the media file 130 during the drag while holding gesture 404, the computing device 102 may capture screen shots of multiple screens. The multiple screen captures may include an initial screen in which the tap and hold gesture 402 occurred and additional screens, up to and including a final screen in which the drag while holding gesture 404 ended (e.g., dragging is stopped or the hold is released). The computing device 102 may extract text from the screen captures (e.g., using OCR) and determine the selected text 144 based on the positional data of the gestures 402 and 404 and the extracted text.

The computing device 102 may perform one or more actions based on the selected text 144 and provide the results 152 in the window 208. For example, the results 152 may include the translation 210 corresponding to the selected text 144, search results 212 based on the selected text 144 and/or the translation 210, and/or results from any other follow-up actions.

Thus, in response to the gestures 402 and 404, the computing device may automatically select multiple words (e.g., "Fully Recurrent Networks") as the selected text 144. In some cases, the selected text 144 may span multiple screens, e.g., multiple frames of a video, multiple pages of a document, or the like. The computing device 102 may automatically perform one or more follow-up actions using the selected text 144. The computing device 102 may automatically display the results 152 of the follow-up actions in the window 208.

Example Processes

Figure 5:
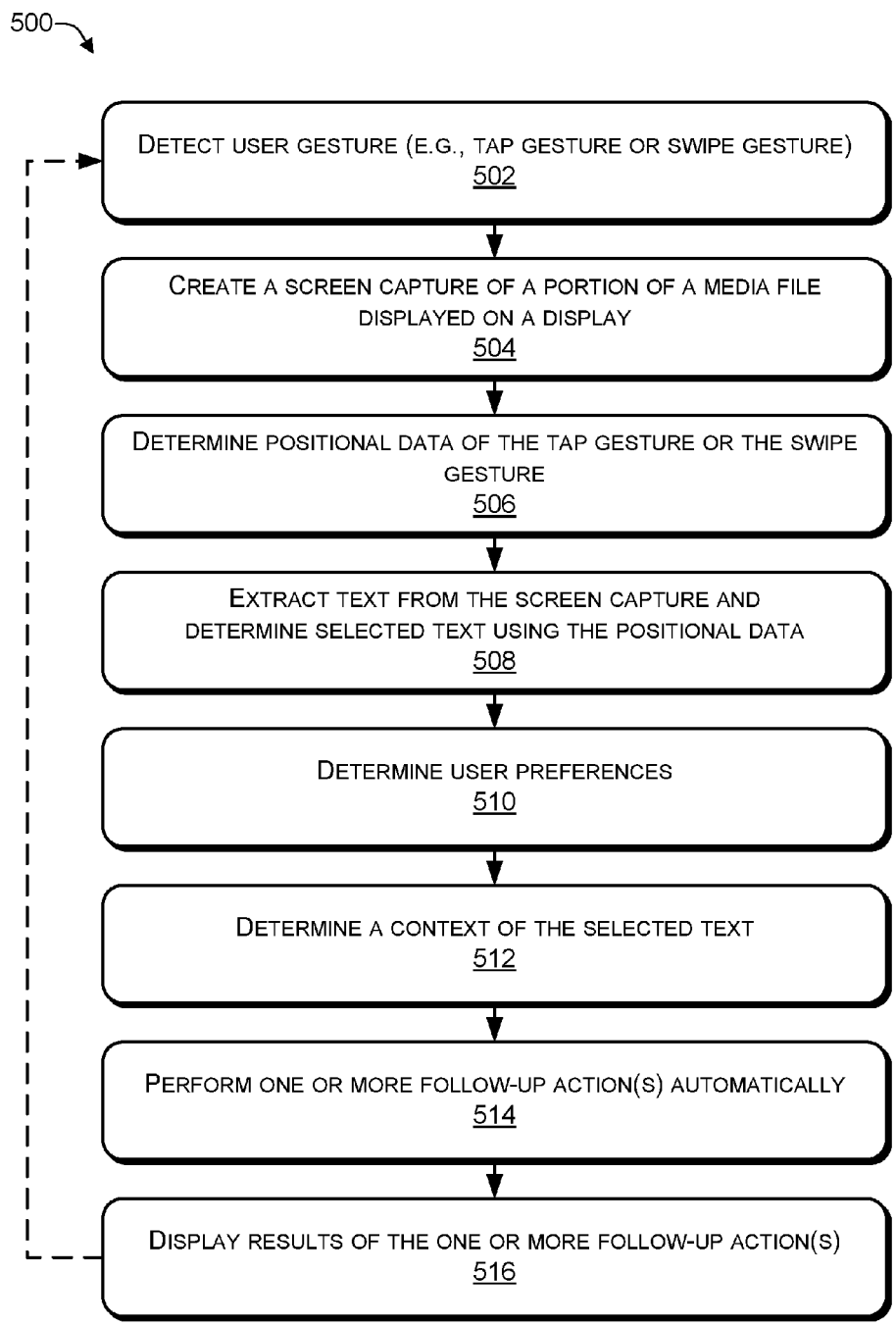
FIG. 5 is a flow diagram of an example process that includes detecting a tap or a swipe gesture according to some implementations.
Figure 6:
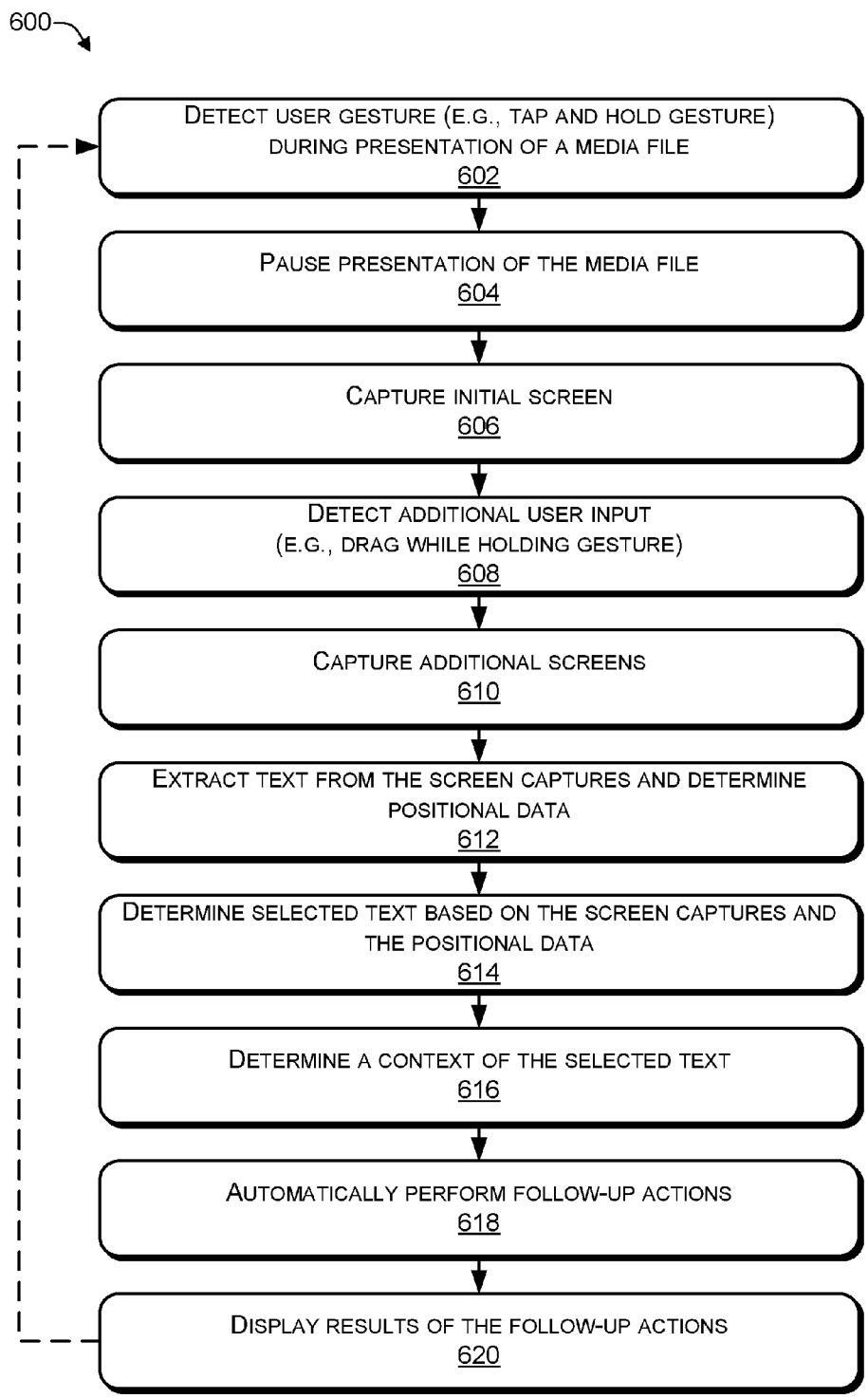
FIG. 6 is a flow diagram of an example process that includes detecting a tap and hold gesture according to some implementations.
Figure 7:
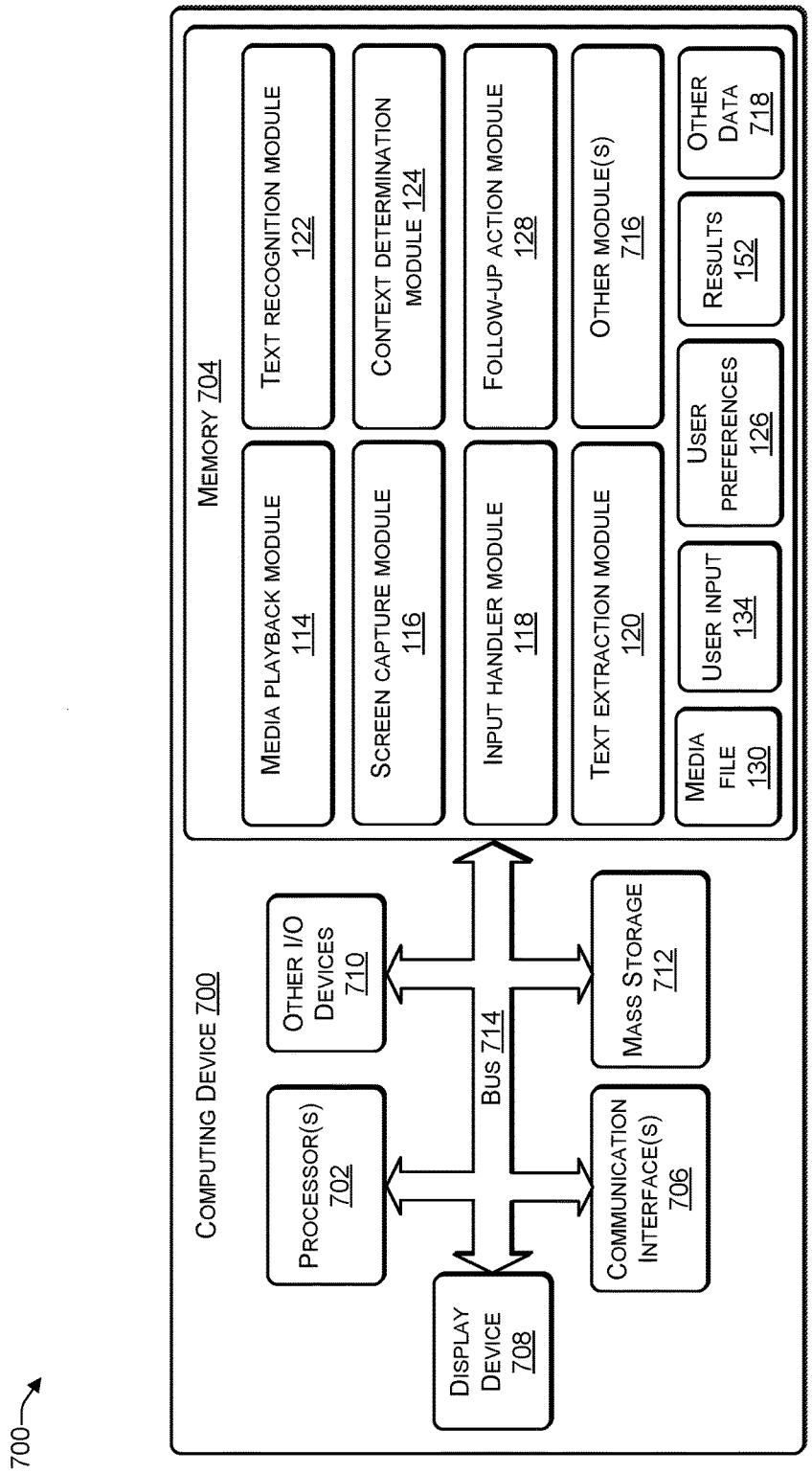
FIG. 7 is a block diagram of an example computing device and environment according to some implementations.

In the flow diagrams of FIGS. 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600 and 700 are described with reference to the architectures 100, 200, 300, and 400, as described above, although other models, frameworks, systems and environments may implement these processes.

FIG. 5 is a flow diagram of an example process 500 that includes detecting a tap or a swipe gesture according to some implementations. The process 500 may, but need not necessarily, be performed by the computing device 102 of FIG. 1, 2, 3, or 4.

At 502, a user gesture (e.g., a tap gesture or a swipe gesture) may be detected. For example, in FIG. 1, the input handler module 118 may detect the user gesture 136. The user gesture 136 may include the tap gesture 204 of FIG. 2 or the swipe gesture 302 of FIG. 3.

At 504, a screen capture of a portion of a media file displayed on a display may be created. For example, in FIG. 1, in response to detecting the user gesture 136, the input handler module 118 may instruct the screen capture module 116 to create the screen captures 132 that capture at least a portion of the media file 130 that is displayed on the touchscreen display 110.

At 506, positional data associated with the tap gesture or the swipe gesture may be determined. For example, in FIG. 1, the input handler 118 may determine positional data 140 associated with the user gesture 136. For the tap gesture 204 of FIG. 2, the positional data 140 may include x and y coordinates of a location on the touchscreen 110 where the tap gesture 204 occurred. For the swipe gesture 302 of FIG. 3, the positional data 140 may include start coordinates and end coordinates of locations on the touchscreen 110 of the swipe gesture 302.

At 508, text may be extracted from the screen capture and selected text may be determined using the positional data. For example, in FIG. 1, the text extraction module 120 may create the extracted text 142 from the screen captures 132 using OCR. The text recognition module 122 may determine the selected text 144 by correlating the positional data 140 with the screen captures 132 and the extracted text 142.

At 510, user preferences may be determined. For example, in FIG. 1, the follow-up action module 128 may determine a user's preferences using the user preferences 126.

At 512, a context associated with the selected text may be determined. For example, in FIG. 1, the context 146 associated with the selected text 144 may be determined from the extracted text 142 by examining words in close proximity to the selected text 144.

At 514, one or more follow-up actions may be performed automatically. At 516, results of performing the one or more follow-up actions may be displayed. For example, in FIG. 1, the follow-up action module 128 may automatically perform the follow-up actions 150 and automatically display the results 152. The follow-up actions 150 may be selected based on one or more of the selected text 144, the context 146, the default actions 148, or the user preferences 126.

If the user performs a user gesture when viewing the results, the process may proceed back to 502. For example, the user may perform a user gesture to select text from the displayed results. The computing device 102 may detect the user gesture, perform a screen capture, extract text from the captured screen, determine positional data associated with the user gesture, and correlate the positional data with the extracted to determine the selected text. The computing device may perform one or more additional follow-up actions using the selected text and display additional results of performing the additional actions. The user may perform another user gesture while viewing the additional results, and so on, resulting in nested levels of follow-up actions and results.

Thus, during presentation of a media file, a user gesture may cause text, such as a word or a phrase, displayed by the media file to be selected. Various actions may be automatically performed using the selected text and the results automatically displayed to the user. In this way, a user can easily obtain additional information about words or phrases displayed during presentation of the media file.

FIG. 6 is a flow diagram of an example process 600 that includes detecting a tap and hold gesture according to some implementations. The process 600 may, but need not necessarily, be performed by the computing device 102 of FIG. 1, 2, 3, or 4.

At 602, a tap and hold gesture may be detected during presentation of a media file. For example, in FIG. 1, the input handler module 118 may detect the user input 134 that includes the user gesture 136. The user gesture 136 may include the tap and hold gesture 402 of FIG. 4.

At 604, presentation (e.g., playback) of the media file may be paused. At 606, an initial screen may be captured. For example, in FIG. 1, in response to determining that the user gesture 136 is a tap and hold gesture (e.g., the tap and hold gesture 402 of FIG. 4), the input handler module 118 may instruct the media playback module 114 to pause playback of the media file 130. The input handler module 118 may instruct the screen capture module 116 to capture an initial screen in which the tap and hold gesture occurred.

At 608, additional user input (e.g., a drag while holding gesture) may be detected. At 610, additional screens may be captured. For example, in FIG. 1, the input handler module 118 may detect that the user gesture 136 includes the drag while holding gesture 404. In response, the input handler module 118 may instruct the media playback module 114 to present additional portions of the media file 130 until the drag while holding gesture has been completed (e.g., until dragging has stopped or the hold is released). While the media playback module 114 is presenting additional portions of the media file 130, the input handler module 118 may instruct the screen capture module 116 to capture additional screens until the drag while holding gesture has been completed.

At 612, text may be extracted from the screen captures and positional data may be determined. At 614, selected text may determined based on the screen captures and the positional data. For example, in FIG. 1, the text extraction module 120 may extract text from the captured screens (e.g., the initial screen and the additional screens). The input handler module 118 may determine the positional data 140 associated with the tap and hold gesture and the drag while holding gesture. The text recognition module 122 may determine the selected text 144 based on one or more of the screen captures 132, the positional data 140, or the extracted text 142.

At 616, a context associated with the selected text may be determined. In some cases, such as when the selected text 144 is ambiguous or a commonly occurring word, the context determination module 124 may determine the context 146. The context 146 may include one or more portions of the extracted text 142, such portions near the selected text 144.

At 618, one or more follow-up actions may be performed automatically. At 620, results of the follow-up actions may be displayed. For example, in FIG. 1, the follow-up action module 128 may automatically perform the follow-up actions 150 and automatically display the results 152. The follow-up actions 150 may be selected based on one or more of the selected text 144, the context 146, the default actions 148, or the user preferences 126.

If the user performs a user gesture when viewing the results, the process may proceed back to 602. For example, the user may perform a user gesture to select text from the displayed results. The computing device 102 may detect the user gesture, perform a screen capture, extract text from the captured screen, determine positional data associated with the user gesture, and correlate the positional data with the extracted text to determine the selected text. The computing device may perform one or more additional follow-up actions using the selected text and display additional results of performing the additional actions. The user may perform another user gesture while viewing the additional results, and so on, resulting in nested levels of follow-up actions and results.

Thus, during presentation of a media file, a user gesture may cause text, such as a phrase, displayed by the media file to be selected. The phrase may span multiple pages (or frames) of the media file. Various actions may be automatically performed using the selected text and the results automatically displayed to the user. In this way, a user can easily obtain additional information about phrases displayed during presentation of the media file.

Example Computing Device and Environment

FIG. 7 illustrates an example configuration of a computing device 700 and environment that may be used to implement the modules and functions described herein. For example, the computing device 700 may be representative of the computing device 102 or one or more of the servers 104. The computing device 700 may include one or more processors 702, a memory 704, one or more communication interfaces 706, a display device 708 (e.g., the touchscreen display 110 of FIG. 1), other input/output (I/O) devices 710, and one or more mass storage devices 712, able to communicate with each other, via a system bus 714 or other suitable connection.

The processors 702 may include a single processing unit or a number of processing units, all of which may include single or multiple computing units or multiple cores. The processor 702 may be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media for storing instructions which are executed by the processor 702 to perform the various functions described above. For example, memory 704 may generally include both volatile memory and non-volatile memory (e.g., RAM, ROM, or the like). Further, mass storage devices 712 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data with other devices, such as via a network, direct connection, or the like, as discussed above. The communication interfaces 706 can facilitate communications within a wide variety of networks and protocol types, including wired networks (e.g., LAN, cable, etc.) and wireless networks (e.g., WLAN, cellular, satellite, etc.), the Internet and the like. Communication interfaces 706 can also provide communication with external storage (not shown), such as in a storage array, network attached storage, storage area network, or the like.

A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

Memory 704 may include modules and components for automatically performing follow-up actions in response to user gestures received during presentation of a media file according to the implementations described herein. In the illustrated example, memory 704 includes the media playback module 114, the screen capture module 116, the input handler module 118, the text extraction module 120, the text recognition module 122, the context determination module 124, and the follow-up action module 128.

Memory 704 may also include other data and data structures described herein, such as the media file 130, the user input 134, the user preferences 126, and the results 152. Memory 704 may further include one or more other modules 716, such as an operating system, drivers, communication software, or the like. Memory 704 may also include other data 718, such as data stored while performing the functions described above and data used by the other modules 716.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media but excludes communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification.

What is claimed is:
1. A computer-implemented method comprising:
   displaying media on a touchscreen display, the media including a photograph;
   detecting a user gesture performed on the touchscreen display;
   determining text selected by the user gesture;

determining a user intent based at least partly on the text selected by the user gesture;

determining a context associated with the text selected by the user gesture based on the user intent, the context including additional text captured in the media, wherein the additional text is associated with the text selected by the user gesture; and automatically performing one or more follow-up actions based at least partly on the text selected by the user gesture and based at least partly on the context.

2. The computer-implemented method of claim 1, further comprising:

extracting additional text from the media to create extracted text;

determining positional data associated with the user gesture; and determining the text selected by the user gesture based on correlating the extracted text with the positional data.

3. The computer-implemented method of claim 1, further comprising:

determining one or more user preferences; and selecting the one or more follow-up actions based on the one or more user preferences.

4. The computer-implemented method of claim 1, further comprising:

determining one or more default actions; and selecting the one or more follow-up actions based on the one or more default actions.

5. The computer-implemented method of claim 1, further comprising:

determining that the user gesture comprises a tap gesture; and determining that the text selected by the user gesture comprises a word.

6. The computer-implemented method of claim 1, further comprising:

determining that the user gesture comprises a swipe gesture; and determining that the text selected by the user gesture comprises one or more words.

7. The computer-implemented method of claim 1, further comprising:

determining that the user gesture comprises a tap and hold gesture including a drag while holding gesture; and determining that the text selected by the user gesture comprises a plurality of words.

8. A computer implemented method comprising:

displaying one or more portions of a first image on a touchscreen display;

receiving, by the touchscreen display, input comprising a user gesture;

identifying selected text in the first image based on the user gesture;

determining that the user gesture comprises:
a tap and hold gesture; and
a drag while holding gesture;

determining that the selected text comprises a plurality of words included in the first image and a second image; and automatically performing at least one follow-up action based at least partly on the selected text.

9. The computer implemented method of claim 8, further comprising:

receiving, by the touchscreen display, a second input comprising a tap gesture; and determining that the selected text in the first image comprises a word.

10. The computer implemented method of claim 8, further comprising:

receiving, by the touchscreen display, a third input comprising a swipe gesture; and determining that the selected text comprises two or more words included in the first image.

11. The computer implemented method of claim 8, wherein:

the tap and hold gesture causes the first image to be selected; and the drag while holding gesture causes selection of text in the first image and the second image to create the selected text.

12. The computer implemented method of claim 8, further comprising:

translating the selected text from a source language to a target language to create translated text.

13. The computer implemented method of claim 8, further comprising:

submitting a search query that includes the selected text to a search engine.

14. The computer implemented method of claim 12, further comprising:

submitting a search query that includes translated text to a search engine.

15. The computer implemented method of claim 8, further comprising:

displaying results from automatically performing the at least one follow-up action in a pop-up window that at least partially overlays the first image on the touchscreen display.

16. A computing device comprising:

a touchscreen display;

one or more processors; and a memory storing instructions that are executable by the one or more processors to perform operations comprising:

displaying an image on the touchscreen display;

detecting a user gesture performed on the touchscreen display;

determining selected text comprising text selected by the user gesture;

determining a context associated with the selected text based on additional text that is within a predetermined distance from the selected text;

modifying the selected text to create modified text based at least partly on the additional text; and automatically performing a follow-up action based on the modified text.

17. The computing device of claim 16, the operations further comprising:

receiving the image from a server.

18. The computing device of claim 16, the operations further comprising:

determining positional data identifying a position of the user gesture relative to the touchscreen display;

extracting additional text from the image using optical character recognition to create extracted text; and correlating the extracted text with the positional data to identify the selected text.

19. The computing device of claim 16, the operations further comprising:

displaying results caused by automatically performing the follow-up action based on the selected text;

receiving an additional user gesture selecting a portion of the results;

performing an additional follow-up action based on the portion of the results; and displaying additional results based on performing the additional follow-up action.

20. The computing device of claim 16, the operations further comprising:

translating the selected text from a source language to a target language to create translated text; and submitting, to a search engine, a search query that includes at least one of the text or the translated text.

* * * * *